United States Patent [19]

Homann et al.

[11] 4,203,046
[45] May 13, 1980

[54] METHOD AND APPARATUS FOR REGULATING THE BRAKE TORQUE OF AN EDDY CURRENT BRAKE

[75] Inventors: Reimer Homann, Reinheim; Prodromos Raptopoulos, Gross-Zimmern, both of Fed. Rep. of Germany

[73] Assignee: Firma Carl Schenck Aktiengesellschaft, Darmstadt, Fed. Rep. of Germany

[21] Appl. No.: 890,184

[22] Filed: Mar. 27, 1978

[30] Foreign Application Priority Data

Apr. 9, 1977 [DE] Fed. Rep. of Germany ....... 2715870

[51] Int. Cl.² ........................................... H02K 49/04
[52] U.S. Cl. .................................... 310/93; 310/94; 310/75; 310/105; 318/803
[58] Field of Search ........................... 310/92–107; 318/802, 803; 361/31

[56] References Cited

U.S. PATENT DOCUMENTS

| | | | |
|---|---|---|---|
| 3,593,083 | 7/1971 | Blaschke | 318/803 |
| 3,629,633 | 12/1971 | O'Callaghan | 310/93 X |
| 3,805,135 | 4/1974 | Balschke | 318/803 |
| 3,824,437 | 7/1974 | Blaschke | 318/803 |
| 4,041,361 | 8/1977 | Cornell | 318/802 |
| 4,057,842 | 11/1977 | Baumann et al. | 361/31 X |

*Primary Examiner*—Donovan F. Duggan
*Attorney, Agent, or Firm*—W. G. Fasse; D. F. Gould

[57] ABSTRACT

The performance of an eddy current brake is controlled by controlling the magnetic flux in its housing by changing the energizing voltage of the energizing coil of the brake in accordance with a signal obtained by comparing a signal representative of the desired brake performance with a signal representative of the actual magnetic flux measured in the housing at a location of substantially homogeneous flux distribution. The desired performance signal may be a signal representative of the difference between a desired rotational speed signal and the actual rotational speed signal, or it may be a signal representative of the difference between a desired torque signal and an actual torque signal. The desired performance signal may also be a signal representative of the difference between a signal obtained by comparing desired and actual rotational speed signals with a signal representative of actual torque. A Hall generator is used to measure actual flux. The Hall generator is located in the housing at a spot having said substantially homogeneous flux distribution.

6 Claims, 4 Drawing Figures

METHOD AND APPARATUS FOR REGULATING THE BRAKE TORQUE OF AN EDDY CURRENT BRAKE

BACKGROUND OF THE INVENTION

This invention relates to a method of and an apparatus for controlling the brake torque of an eddy current brake by varying the energizing voltage in the energizing coil of the eddy current brake.

Eddy current brakes are used for testing motors of all kinds. These brakes take up the energy output of the motor being tested by converting such energy into heat. The heat is then discharged through a cooling medium. The energy output of the motor being tested is usually determined by measuring the torque and the rotational speed or r.p.m. of the motor. The torque absorbed by the eddy current brake is determined by the magnitude of the direct current which flows through the energizing coil of the eddy current brake. The torque absorbed by the eddy current brake is usually referred to as the "brake torque".

However, during the dynamic operation of the brake a time-lag variation occurs in the energizing current as the energizing voltage changes in time. This time-lag is a constant. The respective time constant is determined by the coil and is directly proportional to the self induction of the coil and inversely proportional to the ohmic resistance of the energizing coil.

For testing the dynamic performance of a motor, it is necessary to change the torque absorbed by the brake as quickly as possible. To achieve such rapid torque changes, it is necessary to reduce the rise time of the energizing current which may be accomplished by increasing the ohmic resistance in the energizing coil circuit, whereby the time constant becomes smaller. However, the energizing voltage must be considerably increased during the entire time that the brake is in operation. The operational costs of the brake are thereby increased since the excess voltage cannot normally be utilized effectively.

Another method that has been used is to control the energizing current directly. Both control methods are successfully applied to direct current machines. However, it has been found that in this manner it is not possible to decrease the energizing or de-energizing times of eddy current brakes to any desired extent.

OBJECTS OF THE INVENTION

In view of the foregoing, it is the aim of the invention to achieve the following objects singly or in combination:

to control an eddy current brake so that it will require very short energizing and de-energizing times;

to influence the magnetic flux in the brake housing by varying the energizing voltage and/or direction of current flow of an eddy current brake;

to influence or control an eddy current brake so as to maintain a predetermined torque and/or a predetermined rotational speed (r.p.m.);

to optimize the power requirement necessary for controlling an eddy current brake while simultaneously reducing the energizing and de-energizing times; and to improve the response of an eddy current brake by comparing selectable, actually measured values with a settable rated value to produce a control value for the eddy current brake, to compensate for spurious eddy currents arising in the iron components of the brake as a result of variations of the energizing voltage, and to protect the voltage supply source against excessive currents.

SUMMARY OF THE INVENTION

The invention provides an improved method of controlling an eddy current brake by varying the voltage of the energizing coil of the brake, the voltage being changed in response to a control signal value equal to the difference between a predetermined signal value and a measured signal value of the magnetic flux in the brake housing. It has been found that by practicing the method in accordance with the invention energizing and de-energizing times, respectively, of about 300 msec can be achieved in the eddy current brake without any substantial increase in energy consumption.

If a rapid torque control is to be achieved, an r.p.m. and/or torque control is advantageously superimposed on the control of the magnetic flux. To achieve an improved dynamic control of the rotational speed, a rotational speed control signal is superimposed on the magnetic flux control. Where both torque and rotational speed are to be controlled, their respective control signals may be superimposed on the flux control.

A magnetic flux sensor is attached to a point in the housing of the eddy current brake having a homogeneous magnetic induction. The flux sensor may be a Hall generator. Thus, a signal value representative of the total magnetic flux through the eddy current brake may be derived in a simple manner with a technically rugged structure.

A source of direct current voltage having an inversible polarity, and hence also an inversible current flow direction, may be connected to the energizing coil of the eddy current brake. The direct current voltage source is designed to deliver a maximum voltage considerably above the nominal or rated voltage of the energizing coil, which in accordance with the method of the invention makes it possible to optimize the energizing and de-energizing periods of the eddy current brake.

BRIEF FIGURE DESCRIPTION:

In order that the invention may be clearly understood, it will now be described, by way of example, with reference to the accompanying drawings, wherein.

DETAILED DESCRIPTION OF PREFERRED EXAMPLE EMBODIMENTS

Figure 1:
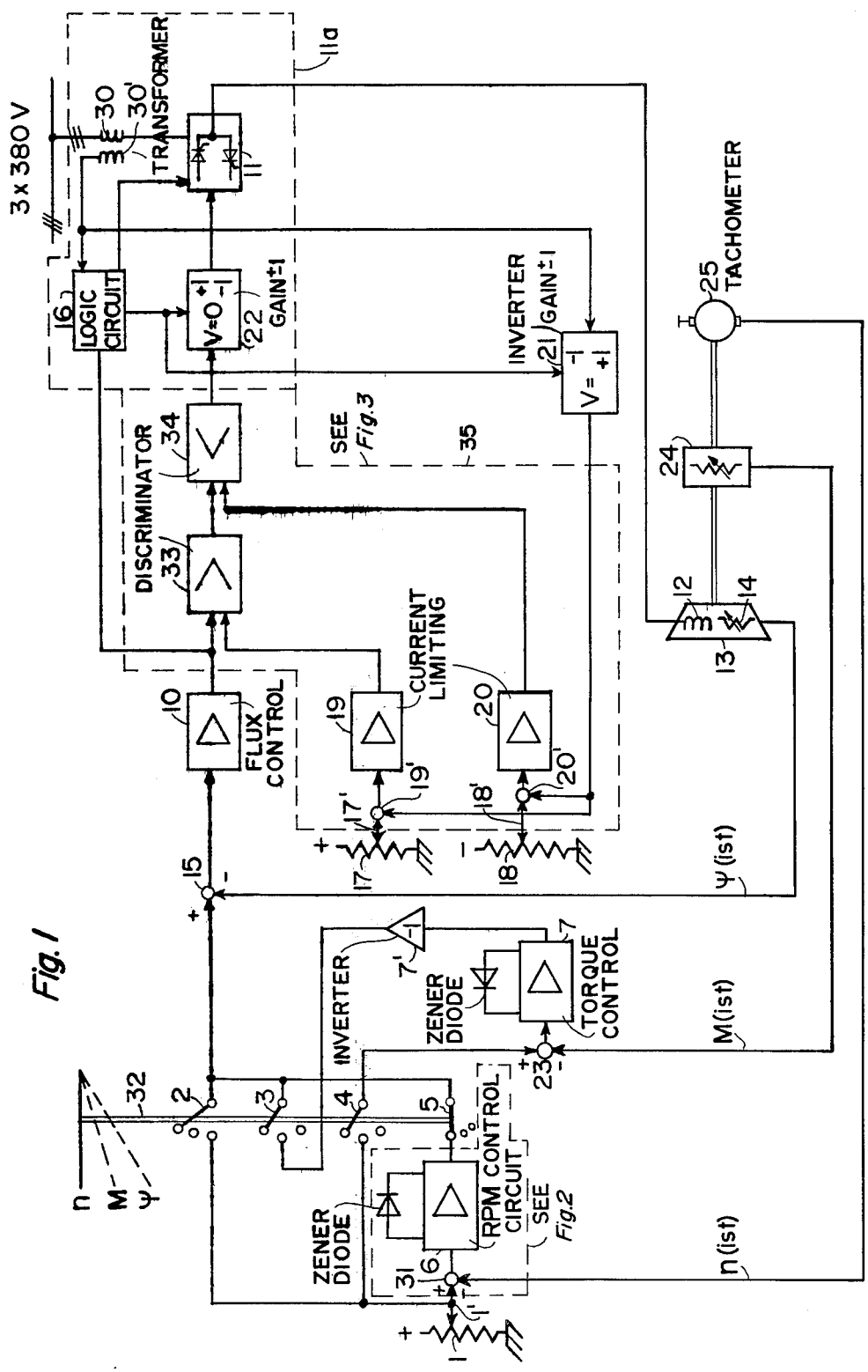
FIG. 1 is a schematic block diagram of a control circuit of a preferred embodiment of the invention.

The block diagram of FIG. 1 shows an energizing circuit for an eddy current brake 13 comprising an electrical energizing coil 12 and a magnetic flux sensor 14, such as, a Hall generator. The circuit is capable of controlling the magnetic flux and/or the rotational speed (r.p.m.) and/or the torque of the brake, by varying the energizing voltage of the coil 12 in accordance with a control signal which is a function of the magnetic flux. The desired or rated value may be set by an adjustable member 1, such as a potentiometer or the hike. A tab 1' of potentiometer 1 is connected to one input of a comparator 31 and to respective contacts of selector switches 2 and 4. Switches 2 and 4 are ganged by a common actuator 32 to further selector switches 3 and 5 for purposes to be described below. It should be noted here, however, that the switches 2, 3, 4, and 5 serve to select the desired control, namely, the rotational speed "n"=r.p.m. or the torque "M", or the magnetic flux "Ψ", whereby the control of the two former items (speed, torque) is superimposed on the magnetic flux control.

The other input of the comparator 31 is connected to an electrical tachometer 25 operatively connected to the brake 13. The tachometer 25 supplies to the comparator 31 a singal "n(ist)" representing the actual rotational speed of the brake 13. The output of the comparator 31 is connected to the input of a rotational speed or r.p.m. control circuit 6. The output of the circuit 6 is connected to the switch 5 which, in the closed position shown in FIG. 1, connects the output of circuit 6 to one input of a further comparator 15. The output of the comparator 15 leads to the input of a magnetic flux control circuit 10, the output signal of which controls the energizing voltage of the coil 12. The other input of the comparator 15 is connected to the Hall generator 14 from which it receives a signal "Ψ(ist)" representing the actual magnetic flux in the brake 13.

Figure 2:
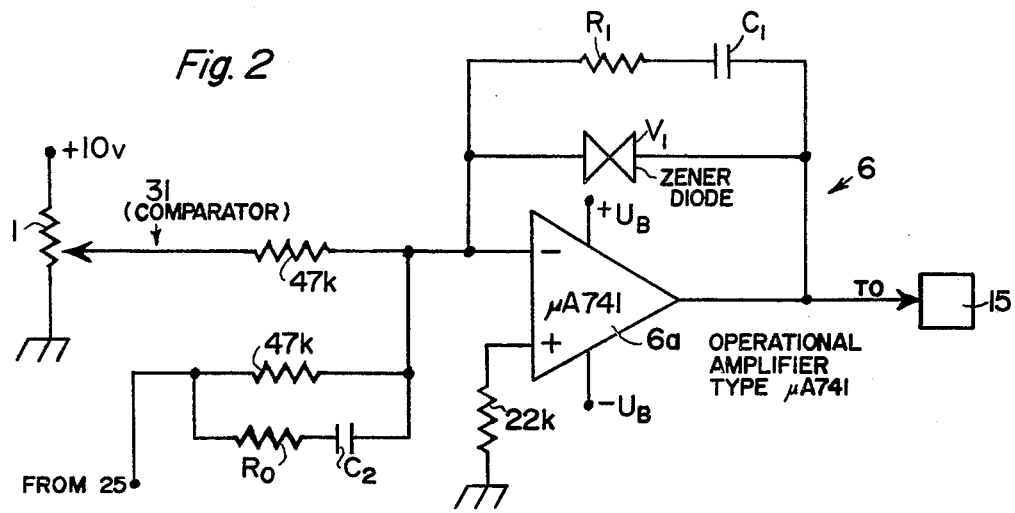
FIG. 2 is a detailed circuit of a comparator and of the speed control means of FIG. 1.
Figure 3:
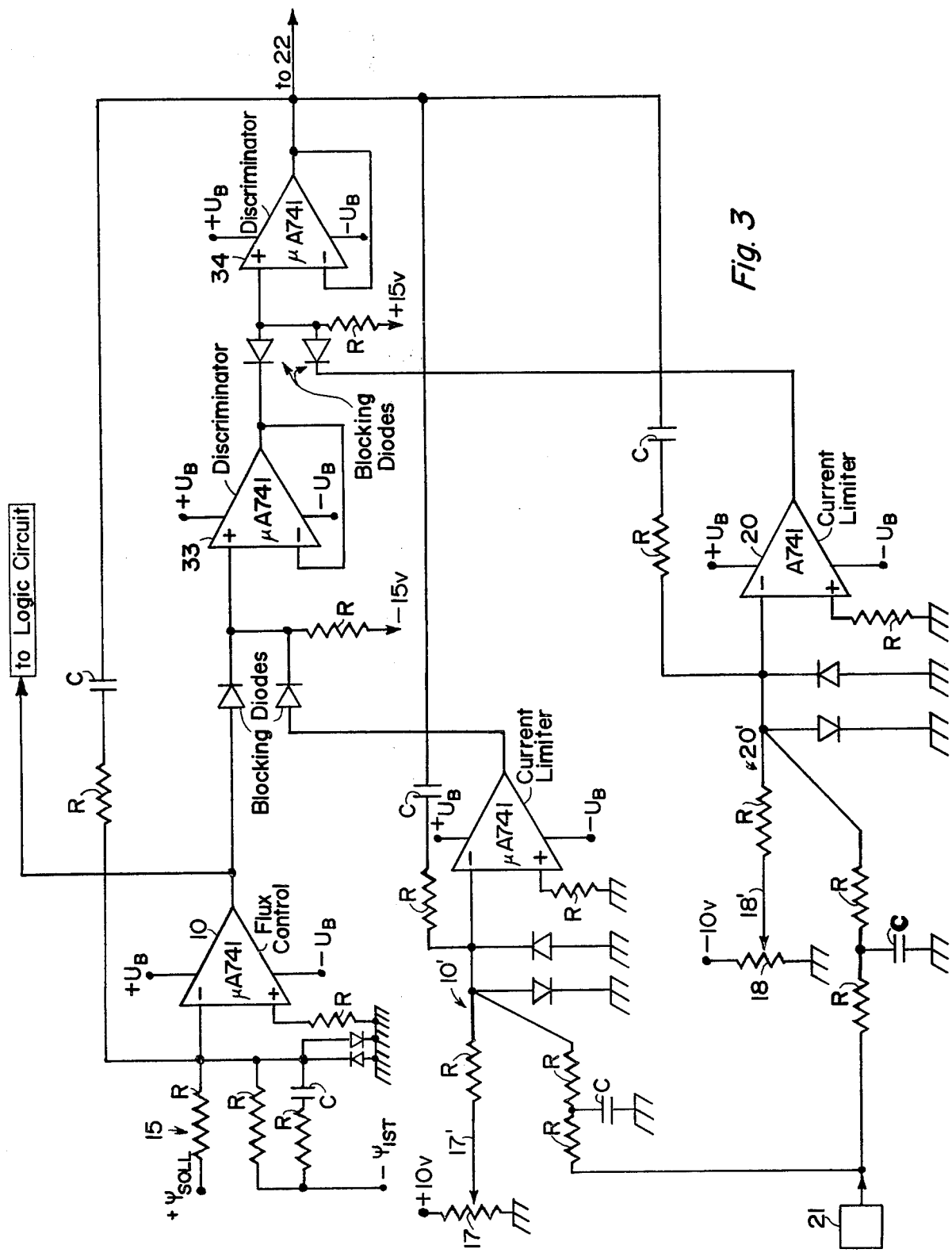
FIG. 3 is a detailed illustration of a circuit arrangement for protecting the power supply of FIG. 1 against high current surges.

FIG. 2 illustrates an example of the comparator circuit 31 and of the speed control circuit 6 comprising an operational differential amplifier 6a having its positive input grounded. The negative input of the amplifier 6a is connected through a resistor, for example, of 47 k Ohm to the tab 1' of the potentiometer 1. The negative amplifier input is further connected to the output of tachometer 25. The amplifier 6a has a negative feedback comprising in parallel circuit arrangement a zener diode V1 and an R-C circuit comprising a resistor R1 and a capacitor C1. The gain of the amplifier 6a is controlled by the R-C branch, and the zener diode V1 limits the output of the amplifier, for instance, to +10 volts. The two branches of the comparator circuit 31 comprise identical limiting resistors, e.g., of 47KΩ. The resistor which is connected to the −n(ist) line is shunted by an R-C circuit including resistor $R_0$ and capacitor $C_2$ to filter out unwanted signals from the tachometer 25. The signal n(ist) represents the actual speed of the brake and is a negative voltage signal which is compared with the positive voltage signal set at the potentiometer. The signal derived from the comparison is inverted by the amplifier 6a and is presented at its output connectable to the comparator 15 through the switch 5. The circuits of the comparator 31 and of the speed control 6 as such are well known in the art. Incidentally, the circuit including the comparator 23 and the torque control 7 is of the same construction as the circuit with the comparator 31 and the speed control 6, except that its corresponding zener diode is inversely connected. As shown in FIG. 3 the circuit with the comparator 15 and the flux control 10 is also similar to the one just described, except that it does not have a zener diode and that it has its corresponding R-C feedback loop connected between the negative input terminal of the operational amplifier of the flux control 10 and the output of block 34. These circuits are well known in the art and need not be described in further detail.

When the selector switch actuator is moved one step in a counterclockwise direction, switch 5 will be opened, switch 4 will be closed to connect the tab 1' of the potentiometer 1 to one input of a further comparator 23, the other input of which is connected with a torque-measuring device 24, e.g., a load cell, which provides a signal proportional to the actual output torque of the eddy current brake 13. The torque proportional signal "M(ist)" is compared in the comparator 23 with the signal set at the potentiometer 1. The output of the comparator 23 applies the difference signal to a torque control circuit 7. The output of the circuit 7 is applied through an inverter 7' and the closed switch 3, to one input of the comparator 15 which receives at its other input the signal "Ψ(ist)" of actually measured magnetic flux. The difference between the two signals is then applied to the flux control circuit 10 for controlling the energizing voltage of the magnetic coil 12.

If the switch actuator 32 is turned another step in the counterclockwise direction, the switches 3 and 4 are opened and the switch 2 will be closed to connect the potentiometer 1 to the comparator 15 which also receives the signal "Ψ(ist)" representing actual flux. The output signal of comparator 15 is applied to the flux control circuit 10 to provide a signal at its output for controlling the energizing voltage of the magnetic brake coil 12 as mentioned.

When switch 5 is closed, the signal derived from the setting of potentiometer 1 is compared with the signal "n(ist)" representing the actually measured rotational speed. The difference signal is then superimposed on the actual flux signal "Ψ(ist)" in the comparator 15. When switches 3 and 4 are closed, and switch 5 is open, the signal from potentiometer 1 is compared with the actual torque signal "M(ist)", and the difference signal is superimposed on the flux signal "Ψ(ist)", also in the comparator 15.

The output signal of the flux control circuit 10 passes through control blocks 33, 34 and 22 and is supplied to the voltage source 11 to which the energizing coil 12 is connected. Blocks 33 and 34 are schematic presentations of discriminator circuits which respectively pass the larger or smaller one of two input signals received. The voltage source 11 comprises an inverse or anti-parallel circuit of two thyristor rectifiers, preferably of the 6-pulse current rectifier type. Both thyristors are connected in common to a three-phase alternating current source of 380 volts, for instance. Hence, the voltage source 11 is capable of supplying a variable direct current voltage of both polarities. The direction of current flow is also inversible. Stated differently, each thyristor rectifier is correlated to one current direction and to two voltage polarities. The three-phase alternating current transformers 30, 30' supply a signal which is proportional to the energizing current flowing in the energizing coil 12. Block 16 is a well known logic circuit which receives the following informations: the polarity of the output signal of the flux control circuit 10 and the signals from the three-phase current transformers 30, 30' indicating whether an energizing current is present or absent. The logic circuit 16 controls the gain or amplification of the unity gain amplifier 21 and 22. Another output of the logic circuit 16 may block the d.c. voltage source 11. The d.c. voltage source 11 used was the reversible current converter marketed by BBC of Germany under the type No.: CAD 2301. This block comprises the three-phase current transducers 30, 31', the logic circuit 16 which includes the unity gain amplifier 22. Detailed information is contained in the 1974/75 catalog No.: DGHS 40 694D published by BBC (Germany). The components of the unit are those shown in FIG. 1 within dashed line box 11a.

It is important that the Hall generator 14 is located in the housing of the brake 13 in a position having a substantially homogeneous magnetic flux distribution, more precisely, in a position of a homogeneous magnetic induction. In order to position the Hall generator at a location of a substantially homogeneous magnetic flux or induction, the housing of the brake 13 may be separated on one side by a copper ring, whereby a particularly advantageous air gap may be obtained. It has been found that at this position the temperature is less than 70° C. The insertion of the copper ring results in homogeneous conditions because of the resulting symmetry of the flux path and, hence, the measured signal "Ψ(ist)" corresponds to the flux of the brake 13. The Hall generator 14 may be replaced by any other suitable flux sensor. Regardless of the kind of sensor used, its output is supplied to one input of the comparator 15, as described above, for controlling the magnetic flux of the eddy current brake 13. Under substantially static operating conditions, the flux control, according to the invention, is proportional to the energizing current flowing through the energizing coil 12 of the brake 13. However, it has been found that under dynamic operating conditions, the energizing current through the coil 12, and the magnetic flux, of an eddy current brake are not any more proportional to each other. During the dynamic operation the brake torque moment of an eddy current brake is, among others, proportional to the square of magnetic flux rather than to the square of the energizing current. This fact appears to be due to the necessity that for mechanical reasons those components of the brake conducting the magnetic flux, must be made of solid iron. Because of this, periodic changes in the energizing current cause spurious eddy currents to be generated in the solid components which oppose the timely or rapid build-up of a magnetic field. These spurious eddy currents are independent of those eddy currents which result from the rotation of the rotor and which are caused by local variations in the magnetic flux. Thus, one must distinguish between two kinds of eddy currents in eddy current brakes. On the one hand, there are the eddy currents caused by the rotation of the rotor which form the basis for the function of an eddy current brake. On the other hand, there are those spurious eddy currents which result from the time variations of the energizing current and which counteract the rapid build-up of the magnetic field. These latter, spurious eddy currents are undesirable and account for the poor dynamic control characteristics of prior art eddy current brakes. The energizing coil 12 of the eddy current brake 13 is comparable in its function to a transformer, the secondary winding of which is short-circuited. This comparison applies because of the solid iron core of the energizing coil. Thus, it may be explained why good functional control characteristics may be achieved in connection with prior art control methods employing direct current machines in which the iron cores are assembled from insulated sheet metal elements, preventing spurious eddy currents from building up as a result of a time variation of the current. On the other hand, in prior art eddy current brakes, the described types of control did not yield the desired good dynamic control characteristics.

If the magnetic flux of an eddy current brake is controlled or regulated as taught by the invention, an adjustment in the rated signal set at the potentiometer causes the voltage source 11 to provide a much higher voltage to the energizing coil 12 than would be necessary in a static operation. In this manner, the voltage component exceeding the value for static operation is employed in compensating for the undesired eddy currents which occur in the solid core of the eddy current brake due to the time variations of the energizing current. In its most advantageous application the present invention provides for a maximum voltage supplied by the voltage source 11 a substantially higher voltage value than the rated voltage of the energizing coil 12 because in this way even very large torque differences can be controlled and adjusted in the shortest possible time. It is an important advantage of the invention that these increased or excessive voltages occur only for very short durations, so that it is not necessary to increase the dimensions of the energizing coil 12 beyond a size customary for eddy current brakes.

In order to achieve a rapid de-energizing of the eddy current brake, it is necessary to apply a direct current voltage having a polarity inverse to the polarity of the voltage used for energerizing, i.e., for the de-energization current the flow must be reversed.

The output currents of the voltage source 11 may be several times higher than the rated currents when large scale variations or changes in the torque occur in very short time periods. Therefore, the voltage source 11 and the energizing coil 12 should be protected from currents which exceed a predetermined value. Circuit 35 is provided for this purpose and becomes effective in case of malfunction. During normal operation the circuit 35 does not affect the control functions, see FIG. 3.

The protective circuit 35 comprises two current limiters 19 and 20, with their respective input controls 17, 17', 19' and 18, 18', 20' and the comparing circuits 33 and 34. During malfunction the current limiter 19 is effective when the current direction from the voltage source 11 to the coil 12 is positive and the current limiter 20 is effective when said current direction is negative. The coil 12 is energized when the polarity of the voltage source 11 is positive and de-energized when the source polarity is negative.

The rated or desired current levels are set by the tabs 17' and 18' of the potentiometers 17 (positive voltage) and 18 (negative voltage) and are compared in comparators 19' and 20', respectively, against the actual current level signals derived from the unity gain circuit 21. The condition or gain of the circuit 21 is set by the logic circuit 16. The gain is −1 in case of positive flow and +1 when the flow is negative. The comparator circuits 33, 34 respectively pass the larger and smaller one of two input signals received. The inputs of comparator 33 are connected to the magnetic flux control 10 and to the positive current limiter 19. The inputs of comparator 34 are connected to the output of comparator 33 and to the output of the negative current limiter 20.

The energization and de-energization of the coil 12 takes place as follows. It is assumed that Ψ is constant. The rated or desired flux value abruptly set at the potentiometer 1 is applied to the flux control circuit 10 through the switch 2 whereby the output signal of circuit 19 becomes negative. Hence, the logic circuit 16 switches to circuits 22 and 21 to −1 gain and renders effective one of the thyristor rectifiers of voltage source 11. The current limiter 19, meanwhile, is in a state of readiness. At the same time, the output signal from the flux control circuit 10 switches the voltage source 11 through the circuits 33, 34 and 22 in such a manner that only one conductive thyristor rectifier applies a large excessive voltage to the energizing coil 12. The voltage polarity and the current flow of this thyristor are initially positive. Due to the large excess in voltage the build-up of the magnetic flux is rapid. As soon as the magnetic flux has reached the set level as determined by the setting of the potentiometer 1, the flux control circuit 10 reduces the voltage from the initial excessive value. As the brake is rotating, this voltage reduction results in a very rapid increase in brake torque moment.

Normally, the output voltage of the positive current limiter 19 is lower than the voltage from the flux control circuit 10. The output voltage of the negative current limiter 20 is higher than the output of the comparator 33. However, if the energizing current exceeds the level set at the potentiometer 17, the output voltage of the positive current limiter 19 becomes positive, i.e., it exceeds the output voltage of the flux control 10. In this case, the positive current limiter 19 will take over the control of the magnetic flux until the energizing current has reached the level set at the potentiometer 1.

In order to reduce the flux for de-energizing the coil 12, the potentiometer 1 is set to a lower value. This causes the output voltage of the flux control 10 to become positive. The output voltage of control 10 passes through circuits 33, 34 and 22 and changes the polarity of the voltage at the energizing coil 12 to negative. However, the current flow direction remains in the positive direction, whereby due to the full application of the negative voltage, the energizing current decays in about 10 msec, but not the magnetic flux. At the same time, the logic circuit 16 senses the "zero condition" of the energizing current and in response to such condition, switches the unity gain circuit 21 to a +1 gain and the unity gain circuit 22 to zero gain for a duration of about 5 msec, whereby the one thyristor is switched off, and whereby during this period of 5 msec, no voltage is applied to, and no current flows through, the energizing coil 12. After about 5 msec the logic circuit 16 switches the circuit 22 to a +1 gain function and renders the other of the thyristor rectifiers of the direct current source 11 conductive. The output of circuit 10 is applied to the voltage source 11 through circuits 33, 34 and 22, whereby a high level voltage of negative polarity and a negative current flow is applied to the energizing coil 12. Such negative or counter current causes the rapid decay of the magnetic flux. During this operation, the current limiter 20 is prepared to limit any excessive currents. As soon as the flux has reached the level set at the potentiometer 1, the polarity of the output voltage of the flux control circuit 10 becomes negative, the voltage polarity of the second thyristor rectifier becomes positive and the current flow direction remains negative, whereby the energizing current is decayed within about 10 msec. The logic circuit 16, in the manner described above, turns off the second thyristor and, following a 5 msec pause, it turns the first thyristor on again. To maintain the level of magnetic flux set at the potentiometer 1, the voltage polarity and the direction of current flow are now positive again. The gain of the unity gain circuits 21, 22 meanwhile has been switched to a −1 gain.

The 5 msec switch over pause for reversing the operation of the circuit is necessary to avoid a short circuit between the two thyristors of the voltage supply 11. Such brief delay is acceptable and does not warrant the use of more expensive circuits which could avoid the switch over pause.

The eddy current brake 13, may, in a manner known as such, be connected to a torque-measuring means, such as a load cell 24, for producing the signal "M(ist)" representing the actually measured torque moment. The signal "M(ist)" may then be supplied to one input of the comparator 23, the other input of which may be connected through switch 4 to the potentiometer tab 1', for comparison with the set signal. The output of the comparator 23 is applied to the input of a torque control circuit 7. The output of circuit 7 is supplied, by way of the inverter 7', to one of the inputs of the comparator 15, the output of which is used as the rated input control signal to the flux control circuit 10. Even though more expensive, it may in some instances be desirable to provide a control for a constant rotational speed with the possibility of limiting the torque moment. Such a circuit arrangement may be realized by a control comprising several control loops and would incorporate a rotational speed control circuit as described above. The output voltage of the speed control provides the desired or rated control input signal for a further subordinate torque moment control circuit as described above with reference to circuit 7. The output voltage of the torque moment control would then provide the desired or rated control signal for the subordinate flux control circuit.

Incidentally, the flux control circuit 10 functions as a PID control circuit providing a proportional integral differential action. The current limiting circuits 19 and 20 function as PI controllers providing a proportional integral action. As shown in FIG. 3, the R-C feedback circuits which determine the proportional integral action of the circuits 10, 19, and 20 are preferably connected to the output of the comparing circuit 34, whereby overshooting of the magnetic flux or of the energizing current is reduced when one control circuit is disengaged from the other control circuit.

With regard to FIG. 3 it should be mentioned that the diodes at the negative inputs of the operational or control amplifiers 10, 19, 20 prevent the overloading of the feedback capacitors to voltages exceeding the rated voltages of the operational amplifiers. The RC components at the inputs to the current limiting operational amplifiers 19, 20 filter the input signal from the unity gain amplifier 21 representing the actual energizing current of the coil 12 of the eddy current brake. The filtering time constant of these RC components should be about 1 msec.

Figure 4:
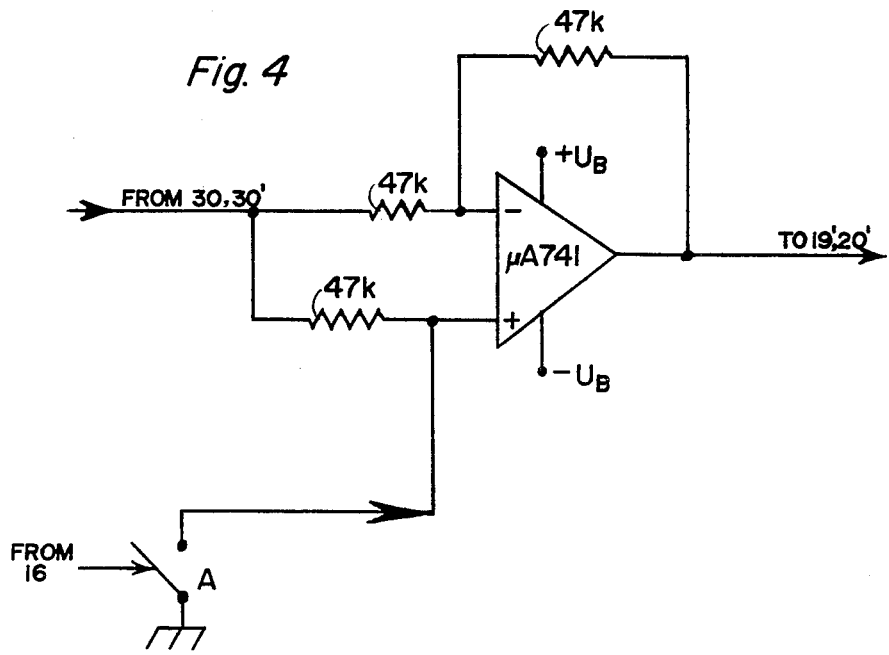
FIG. 4 is a detailed presentation of the circuit in block 21 of FIG. 1.

With regard to FIG. 4, the switch A is responsive to the logic circuit 16. When the switch A is open the gain is +1 in the unity gain amplifier 21. When the switch A is closed the gain is −1.

Although the invention has been described with reference to specific example embodiments, it is to be understood that it is intended to cover all modifications and equivalents within the scope of the appended claims.

What is claimed is:

1. A circuit arrangement for controlling an eddy current brake, comprising rated signal value setting means (1), first comparator means (31) connected with one input to said setting means (1), actual speed representing signal means (25) connected to another input of said first comparator means (31), speed signal providing means (6) connected to said first comparator means, multiposition selector switch means (32) connectable to said setting means (1) and to said speed signal providing means (6), second comparator means (23) operatively connectable through said multiposition switch means (32) to said setting means (1), actual torque signal measuring means (24) connected to said second comparator means (23), torque signal providing means (7) connected to said second comparator means (23), third comparator means (15) selectively connectable through said selector switch means to said setting means (1), to said speed signal providing means (6), and to said torque signal providing means (7), actual magnetic flux sensing means (14) connected to said third comparator means (15), energizing coil means (12) in said eddy current brake (13), d.c. voltage supply means (11) operatively connected to said coil means (12), control circuit means (10, 16) operatively connected to said third comparator means (15) and to said d.c. voltage supply means for controlling the supply of energizing voltage from said supply means (11) to said coil means (12), and current limiting means (17, 18, 19, 20, 19', 20', 21, 22, 33, 34) operatively connected in a closed loop circuit to limit the power supply to said coil means (12) within presettable limits.

2. An apparatus for controlling the torque moment of an eddy current brake, comprising solid iron housing means for said brake, brake energizing coil means operatively arranged in said solid iron housing means, said energizing coil means having a rated operating voltage, magnetic flux sensor means (14) operatively arranged in said solid iron housing means for providing an actual magnetic flux representing signal derived from a sensing location in said solid iron housing means, adjustment means for providing a rated magnetic flux representing signal, comparator means (31) operatively connected to said sensor means and to said adjustment means for comparing said rated magnetic flux representing signal with said actual magnetic flux representing signal to establish a magnetic flux difference representing control signal, said apparatus further comprising energizing voltage supply means including a voltage source having positive and negative terminals providing respective terminal voltages substantially higher than said rated operating voltage of said energizing coil means, means operatively connecting said energizing voltage supply means to said comparator means and to said energizing coil means for controlling the supplying of the energizing and deenergizing voltage to said energizing coil means in response to said magnetic flux difference representing control signal whereby the magnetic flux in the solid iron eddy brake is controlled to obtain a rapidly variable brake torque moment characteristic for said eddy current brake by making said energizing and deenergizing voltage temporarily substantially higher than said rated operating voltage of said energizing coil means in response to said magnetic flux difference representing control signal.

3. The apparatus of claim 2, further comprising means (1) for providing a rated torque signal, means (24) for measuring an actual torque representing signal, second comparator means (23) operatively connected to receive said rated torque signal and said actual torque representing signal to produce a difference torque signal, and means operatively interconnecting said second comparator means and said energizing voltage supply means for superposing said difference torque signal on said flux difference representing control signal.

4. The apparatus of claim 2, further comprising means (1) for providing a rated r.p.m. signal, means (25) for measuring an actual r.p.m. representing signal, third comparator means (31) operatively connected to receive said rated r.p.m. signal and said actual r.p.m. representing signal to produce a difference r.p.m. signal, and means operatively interconnecting said third comparator means and said energizing voltage supply means for superimposing said difference r.p.m. signal on said flux difference representing control signal.

5. The apparatus of claim 2, wherein said magnetic flux sensor means (14) are operatively arranged in said solid iron brake housing means in a sensing location having a substantially homogeneous distribution of the magnetic induction.

6. The apparatus of claim 2, wherein said brake torque moment is proportional to the square of the magnetic flux.

* * * * *